United States Patent [19]

Jacobs

[11] 4,188,576
[45] Feb. 12, 1980

[54] ANGULAR RATE SENSOR

[75] Inventor: Paul L. Jacobs, Huntsville, Ala.

[73] Assignee: The United States of America as represented by the Secretary of the Army, Washington, D.C.

[21] Appl. No.: 941,531

[22] Filed: Sep. 11, 1978

[51] Int. Cl.² ............................................. G01P 3/46
[52] U.S. Cl. .................................... 324/163; 73/518
[58] Field of Search ............ 73/194 EM, 518; 310/11, 310/178; 324/163

[56] References Cited
U.S. PATENT DOCUMENTS

| | | | |
|---|---|---|---|
| 3,143,673 | 8/1964 | Donaldson | 310/178 X |
| 3,479,537 | 11/1969 | Jenny et al. | 310/11 |
| 3,566,687 | 3/1971 | Mittelmann | 73/194 EM |

Primary Examiner—Jerry W. Myracle
Attorney, Agent, or Firm—Nathan Edelberg; Robert P. Gibson; Robert C. Sims

[57] ABSTRACT

An angular rate sensor is conceived which operates by utilizing electrically conducting fluid flowing in a transverse magnetic field. The electric field induced in the flow direction due to rotation will produce a signal that is proportional to angular rate.

4 Claims, 2 Drawing Figures

ANGULAR RATE SENSOR

DEDICATORY CLAUSE

The invention described herein was made in the course of work with the Government and may be manufactured, used, and licensed by or for the Government for governmental purposes without the payment to me of any royalties thereon.

DESCRIPTION OF THE PREFERRED EMBODIMENT

Figure 1:
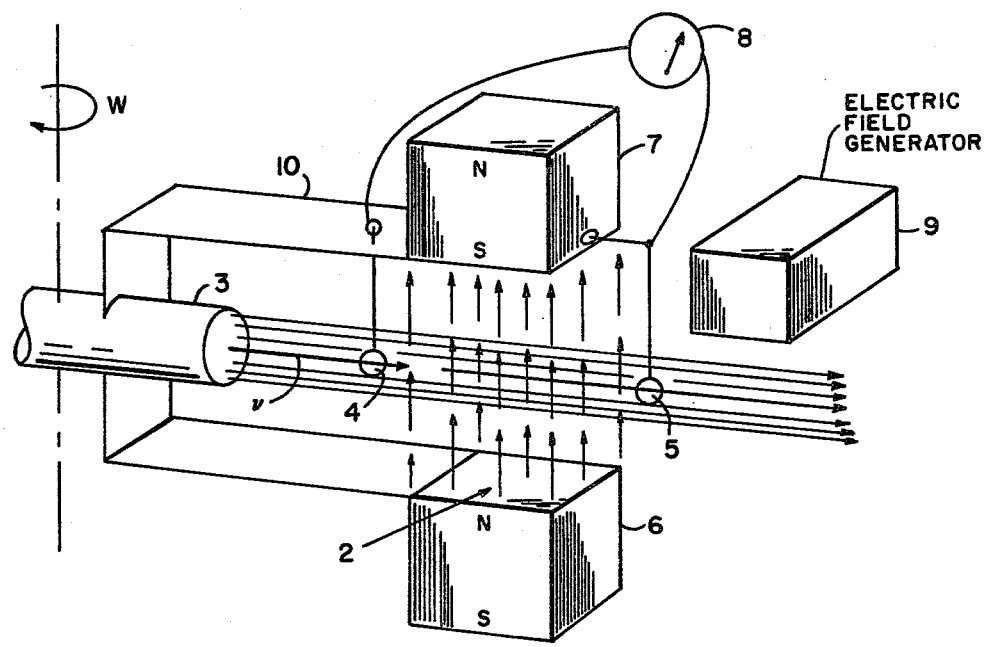
FIG. 1 is a diagramatic showing of the preferred embodiment of present invention.
Figure 2:
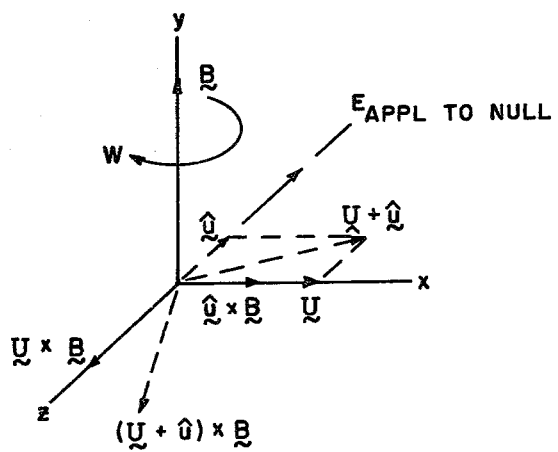
FIG. 2 is a vector diagram showing the principles of the invention.

The purpose of this device shown in FIG. 1 is to provide for a means of sensing angular rate utilizing the properties of a conducting fluid 1 flowing in a magnetic field 2. The concept makes use of two physical phenomena. The first is the relative velocity a fluid flowing in an inertial reference frame appears to have when viewed from a rotating reference frame; the second is the fact that a conducting fluid flowing in a transverse magnetic field will induce an electric field perpendicular both to the fluid motion and the magnetic field. If the fluid exhausts from a nozzle 3 as a free jet while the nozzle 3, the magnet 6 and 7, frame 11 and sensor pickup 4 and 5 are rotating at angular frequency w, the jet will appear to have a component of velocity $\hat{u}$ perpendicular to the sensor centerline at some distance y down stream of the nozzle. (See FIGS. 1 & 2). This component of velocity is linearly related to the angular rate of the sensor. If a transverse magnetic field of flux density B is applied across the fluid stream, the interaction of the $\hat{u}$ and B fields will cause an electric field to be induced along the sensor centerline which will rotate with the sensor. Since the fluid is electrically conducting, an induced current will flow along the sensor centerline, of magnitude $I = \sigma A (U \times B)$, where $\sigma$ is the scalar fluid electrical conductivity and A is the area of the fluid stream. An electrical meter 8 connected between the nozzle exit and the location $\gamma$ on the sensor centerline can measure this current, which will be proportional to the angular rate w.

The fluid stream of velocity $\underline{U}$ will have a retarding Lorentz force $\sigma (\underline{U} \times \underline{B}) \times \underline{B}$ in the negative X direction. This will decrease the fluid velocity $\underline{U}$ and the effective conductivity. This retarding effect can be negated by applying an electric field from generator 9 in the negative Z direction. This may or may not be necessary to optimize sensor performance, depending upon the relative magnitudes of the field strength and electrical conductivity of the fluid.

Most angular rate sensors sense inertial forces and mechanically transduce the force to an electrical or fluid signal. This device uses the inherent properties of the conducting fluid in a plasma, liquid metal, etc., to get a direct electrical signal output proportional to angular rate.

The principle can be applied any place a conducting fluid and magnetic field are available; e.g., on a small MHD power generator on a space station, or to sense yaw or pitch utilizing conducting gases in a rocket nozzle, plasma jets, etc.

In summary it can be seen that no voltage will be induced in the conducting fluid in the absence of any rotation of the system as there would be no apparent motion of the fluid jet relative to the magnetic field. However upon rotation of the system the fluid jet, not being connected to the system upon exit from the nozzle 3, continues on in its initial direction while the system and therefore the magnetic fluid moves relative to the jet. This causes an electric voltage to be induced 8 to measure the induced voltage in the conducting fluid 1.

I claim:

1. A sensor device comprising an electrically conducting fluid flowing in a given direction; first means for producing a magnetic field transverse to the direction the fluid is flowing; sensor means located in said fluid so as to detect any electric current flowing through said fluid; a nozzle means for ejecting said fluid in a free flowing jet; said nozzle means and said first means are connected in a fixed relationship to each other; said nozzle means and said first means being subject to movements which cause relative movement between the free flowing jet and said magnetic field; and said sensor means detecting the current flow caused by said relative movement.

2. A sensor device as set forth in claim 1 wherein the device is mounted for rotation on an axis which is parallel to the direction of the magnetic field.

3. A sensor device as set forth in claim 1 further comprising a means for producing an electric field transverse to both the magnetic field and the direction the fluid is flowing.

4. A sensor device as set forth in claim 3 wherein said sensor means are first and second probes connected spatially in said conducting fluid; in the direction of fluid flow and an indicating device connected electrically to said first and second probes.

* * * * *